(12) United States Patent
Holman et al.

(10) Patent No.: US 6,778,871 B2
(45) Date of Patent: Aug. 17, 2004

(54) PIPING AND STRUCTURAL COMPONENT DESIGN AND FABRICATION SYSTEM

(75) Inventors: Allen Holman, Knoxville, TN (US); Curtis Broughton, Littleton, CO (US)

(73) Assignee: QuickPen International, Inc., Englewood, CO (US)

( * ) Notice: Subject to any disclaimer, the term of this patent is extended or adjusted under 35 U.S.C. 154(b) by 49 days.

(21) Appl. No.: 10/040,537

(22) Filed: Dec. 28, 2001

(65) Prior Publication Data

US 2003/0125826 A1 Jul. 3, 2003

(51) Int. Cl.$^7$ .............................................. G06F 19/00
(52) U.S. Cl. ..................... 700/98; 700/106; 700/171; 700/182
(58) Field of Search ..................... 700/98, 106, 107, 700/171, 182

(56) References Cited

U.S. PATENT DOCUMENTS

| | | | |
|---|---|---|---|
| 4,349,182 A | | 9/1982 | Blackburn |
| 4,551,810 A | * | 11/1985 | Levine ........................ 700/182 |
| 5,062,068 A | * | 10/1991 | Kondo et al. .................. 703/9 |
| 5,740,341 A | * | 4/1998 | Oota et al. ................... 345/420 |
| 6,041,171 A | * | 3/2000 | Blaisdell et al. ............... 703/6 |
| 6,335,508 B1 | * | 1/2002 | Nam ..................... 219/121.67 |
| 2002/0107671 A1 | * | 8/2002 | Ballus ........................... 703/1 |
| 2003/0033117 A1 | * | 2/2003 | Sage ........................... 702/182 |

* cited by examiner

Primary Examiner—Leo Picard
Assistant Examiner—Elliot Frank
(74) Attorney, Agent, or Firm—Townsend and Townsend and Crew LLP (57) ABSTRACT

A system including a method for designing and fabricating piping and structural components for a piping network. A CAD (computer assisted design) system is initially employed to generate one or more pipe drawings and associated data for the piping network after which the information is stored in a memory of the CAD system. Thereafter, the pipe drawings and associated data information is automatically retrieved by a second computer for a fabrication unit. Based on the pipe drawings and associated data, the fabrication unit selects one or more pieces of piping and other raw materials needed for the fabrication; and thereafter fabricates from the raw materials, the piping and structural components for the piping network.

17 Claims, 14 Drawing Sheets

PIPING AND STRUCTURAL COMPONENT DESIGN AND FABRICATION SYSTEM

BACKGROUND OF THE INVENTION

The present invention relates generally to the field of pipe fabrication and more specifically to a system and method for designing and fabricating piping and structural components.

Conventional systems for fabricating piping and structural components are well known. Piping and structural components are important not only as structural members but in other areas where solids, liquids and gases have to be transferred from one point to the other. A user wishing to fabricate piping components begins by preparing drawings of the piping network having the piping components. The network is designed using a computer aided design/computer aided manufacturing (CAD/CAM) system.

A CAD/CAM system well known in the art as AutoCAD is a software-based tool that assists users in visualizing, selecting components or materials and developing a set of drawings from which a product can be manufactured. For a piping network, the drawings typically include the layout of the pipes, dimensions, specifications, interconnections and intersections between the pipes. Once the drawings are completed, the piping network as designed must be fabricated on the fabricating unit. Herein lies some of the problems of the related art.

A skilled artisan must manually transfer information associated with each section and pieces of the piping network from the drawing to the fabricating unit. Each section including dimensions, the interconnections and the like must be painstakingly and manually entered into the fabrication unit. It is only after transferring the dimensions to the fabrication unit that the piping network and the patterns contained therein may be fabricated since the CAD/CAM system has no idea which patterns to form. Not only is manual transfer of the pattern data laborious, it can lead to costly errors. If the dimensions of a pipe are erroneously entered, the pipes will be incorrectly fabricated. Given the fact that pipes are relatively expensive, incorrect piping fabrication will certainly increase fabrication costs.

A conventional system for transferring data from a CAD/CAM system to a fabrication unit for duct work fabrication is known. Duct work fabrication is unique in that it employs a "one piece at a time custom pattern development" and manually controlled cutting of the development patterns. However, the attributes of piping fabrication make the aforementioned duct work system inapplicable to piping fabrication. An example of one attribute relates to a concept known as spooling. In pipe fabrication, spooling refers to fabricating and assembling sections of a piping network prior to arrival at the field. Multiple spools can be fabricated and assembled at a time. This saves time and labor since these spools do not need to be fabricated and assembled in the field. In conventional systems for transferring duct fabrication data, there is no design of spooling patterns, no transfer of spooling information and no fabrication and assembly based on such information.

Therefore, a need exists to solve the aforementioned problems and the present invention meets this need.

BRIEF SUMMARY OF THE INVENTION

The present invention provides an automated solution for users such as pipe fabricators and mechanical contractors. The system automatically retrieves cutting information for fabricating components of a piping network. The system cuts holes, fish mouths for O-lets, saddles and laterals; bevel ends in pieces of a pipe; and cuts the pattern to attach a lateral to the hole cut in the pipe. Alternatively, all of the cutting information may be manually entered. According to a first aspect of the present invention, a method for designing and fabricating piping and structural components for a piping network is disclosed. A CAD (computer assisted design) system is initially employed to generate one or more pipe drawings and associated data for the piping network after which the information is stored in a memory of the CAD system.

Thereafter, the pipe drawings and associated data information are selected and then automatically retrieved by a second computer for a fabrication unit. Based upon the pipe drawings and associated data, the fabrication unit selects one or more pieces of piping and other raw materials needed for the fabrication; and thereafter fabricates the piping and structural components for the selected items.

According to another aspect of the present invention, a computing user interface for transferring piping fabrication information to a fabrication unit is taught. Among other components, the user interface includes (1) one or more software instructions for accepting user selection of one or more pipe drawing files, the pipe drawing files being generated by a computer aided design software; (2) one or more software instructions for displaying one or more spool files associated with the pipe drawing files; (3) one or more software instructions for accepting user selection of one or more of the spool files; and (4) one or more software instructions for retrieving the spool files selected into the fabrication unit for fabrication.

According to another aspect of the present invention, a system for designing and fabricating piping and structural components is taught. The system includes a design computing device for preparing drawings and associated data for the piping and structural components. It should be observed that the drawings may be stored in memory of the design computing device. Further, a fabrication unit which includes both a fabrication computing device and a cutter comprises part of the system. In response to a request from the fabrication computing device, the design computing device automatically forwards the drawings and associated data to the fabrication computing device. The fabrication unit is such that upon receiving the drawings, raw materials are loaded onto the fabrication unit. Thereafter, the cutter fabricates the raw materials received in accordance with the drawings and associated data.

Advantageously, unlike a conventional system, the bevel cuts of the present invention are clean and accurate requiring little or no grinding. This increases consistency and avoids the need for re-fabrication. Furthermore, the CAD specifies the end treatments determining how the ends are trimmed (i.e. the bevel angle) and the 3-D spatial information determine the hole pattern and the end pattern for the intersecting pipe.

A further understanding of the nature and advantages of the present invention herein may be realized by reference to the remaining portions of the specification and the attached drawings. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

Briefly, an automated information retrieval and pipe fabrication system is provided for pipe network design and fabrication for use by pipe fabricators, mechanical contractors and like. The system automatically retrieves information from a CAD (computer aided design) system, forwards the information to a fabrication system in order to fabricate a pipe item. This results in cuts such as holes and fish mouths for O-lets, saddles, laterals; and bevel the ends of a pipe. A pattern for attaching a lateral to the hole in the pipe is also produced. According to a first aspect of the present invention, a method for designing and fabricating piping and structural components for a piping network is taught. A user employs the CAD system for generating one or more pipe drawings and associated data for the piping network after which the information is stored in a memory of CAD system.

Next, the pipe drawings are selected and associated data information is automatically retrieved by a second computer for a fabrication unit. Based on the pipe drawings and the associated data, the fabrication unit selects one or more pieces of piping and other raw materials needed for the fabrication, after which the raw materials are fabricated.

Figure 1A:
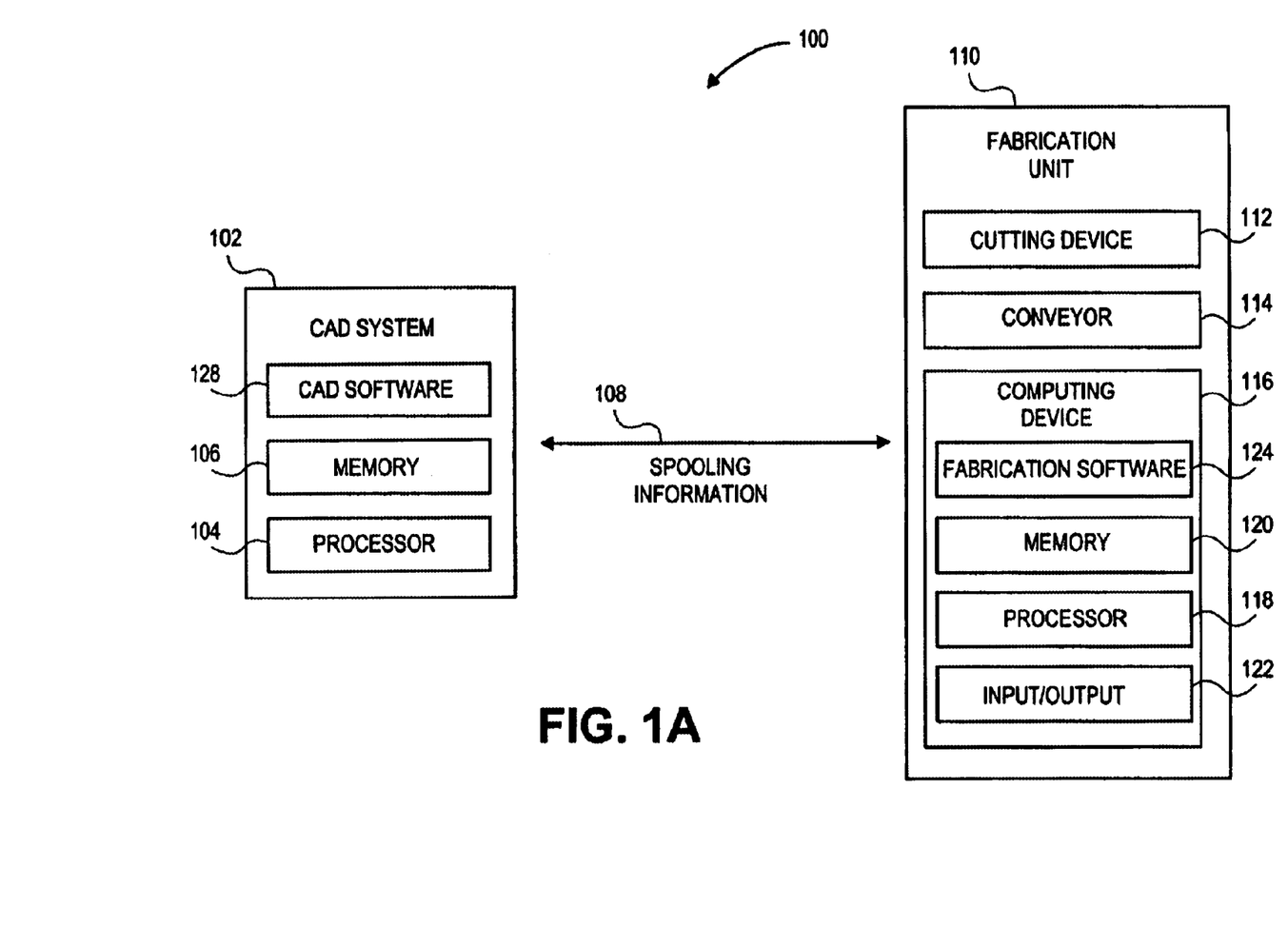
FIG. 1A is a block diagram of a pipe fabrication system for designing and fabricating piping networks in accordance with a first embodiment of the present invention.

FIG. 1A is a block diagram of a pipe fabrication system 100 for designing and fabricating piping networks in accordance with a first embodiment of the present invention.

Among other components, pipe fabrication system 100 comprises a CAD (computer aided design) system 102 for designing a piping network using a processor 104 and a memory 106, and a fabrication unit 110 for fabricating the pipes based on information received from CAD system 102. The fabrication unit 110 further comprises a computing device 116 having a processor 118, an input/output device 122 and CAD software 128 that is executable within memory 106 for importing information from CAD system 102. Other components of pipe fabrication system 100 include a conveyor 114 for transporting pipes from storage to cutting device 112 which fabricates the pipes. CAD system 102 may be locally or remotely coupled to fabrication unit 110 via a communication link 108. Communication link 108 may be a cable (e.g. RS232), a wireless link or a TCP/IP connection via the Internet.

Briefly, in use, a user wishing to fabricate a piping network begins by designing one or more pipe drawings using CAD system 102, after which the drawings are divided into one or more subsystems (spools). Thereafter, the user makes the various raw materials parts available to fabrication software 120 through which the desired spools are imported. Once the information has been imported into fabrication unit 110, processor 118 directs cutting device 112 to fabricate pipes received via conveyor 114 according to cutting information extracted from the spools. CAD system 102 is well known in the art and need not be described in detail. One CAD system suitable for use in the present invention is the PipeDesigner 3D CAD™ available form QuickPen International Inc. of Englewood Colo. CAD system 102 produces isometric drawings and has the added advantage of comprising a large library of standard piping items for producing the drawings.

Figure 2:
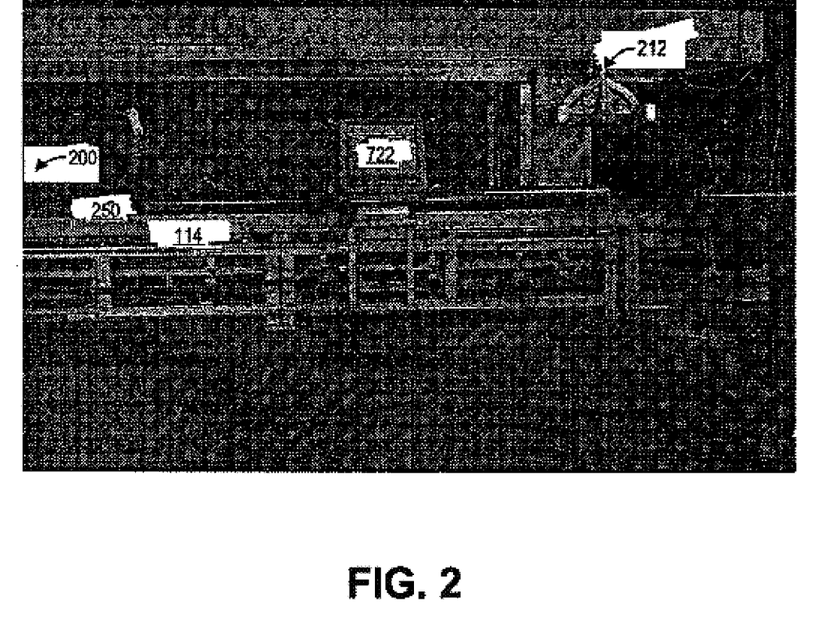
FIG. 2 is a front view of fabrication unit of FIG. 1.

FIG. 2 is a front view of fabrication unit 110 of FIG. 1. In this exemplary embodiment, cutting device 112 is shown at a distal end of fabrication unit 110. Cutting device 112 is rotate-ably attached so that its cutting head may be rotated as proves necessary for pipe cutting. In addition, the pipe is rotated so that the cutting point on the pipe is adjacent to the cutting head. To permit pipes to be cut in a lengthwise direction, cutting device 112 is moveable in a proximal-distal direction. While cutting device 112 is plasma driven, one of ordinary skill in the art will realize that other suitable heads driven by acetylene may be utilized. Further, although not shown, fabrication unit 110 may include a plotting device or the like for marking patterns on piping items.

Input device 122 of computing device 116 is shown at an operator station. An example of input device 122 is a touch screen device which provides ease of use further described with reference to FIG. 4. Although not shown, input device 122 may be other comparable input devices such as a keyboard, mouse or the like. Conveyor 114 is shown situated laterally to an operator station wherein input device 122 is located. Conveyor 114 extends the from a storage area 200 located at the proximal end of fabrication unit 110 wherein raw materials (e.g. standard pipe sizes) are stored to cutting device 112 located at a distal end of fabrication unit 110. As shown, a piping item 250 is forwarded from storage area 200 to cutting device 112. This is more clearly shown in FIG. 3.

Figure 3:
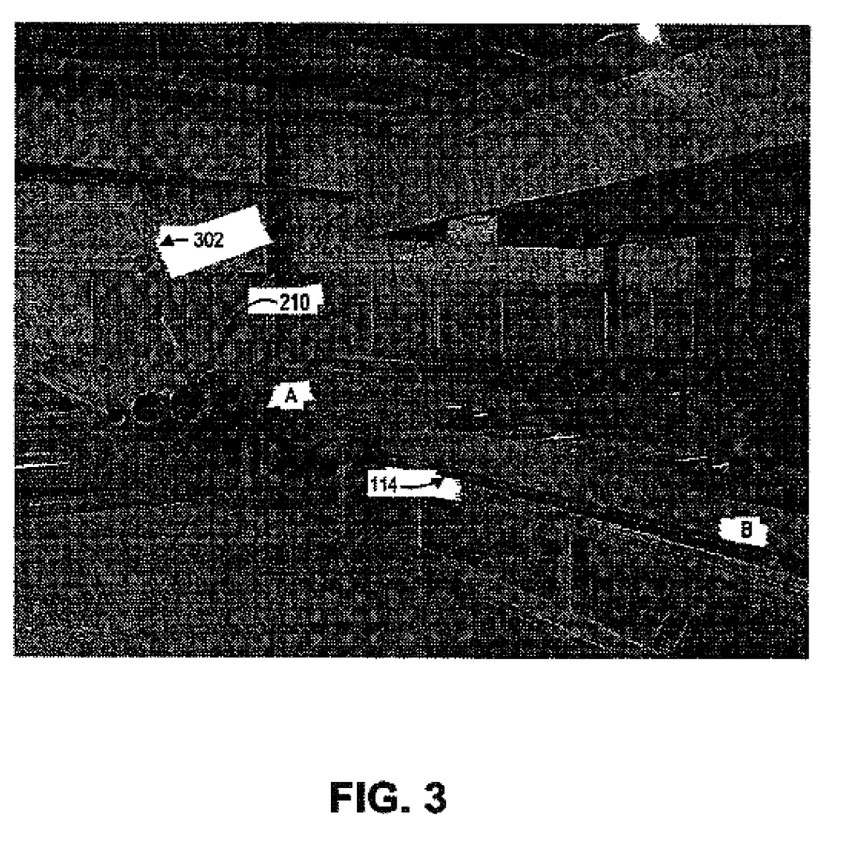
FIG. 3 is a lateral view of storage area for storing raw materials for the fabrication unit of FIG. 1.

In FIG. 3, a lateral view of storage area 200 for storing raw materials for fabrication unit 110 is shown. Based on the pipe drawings and associated data obtained from CAD system 102, fabrication unit 110 selects one or more pieces of piping and other raw materials needed for the fabrication. Using a crane 302, an operator loads the selected piping material at the proximal end A of conveyor 114. Thereafter, conveyor 114 transports the piping material to cutting device 112 which fabricates the material according to the cutting information provided.

Figure 4:
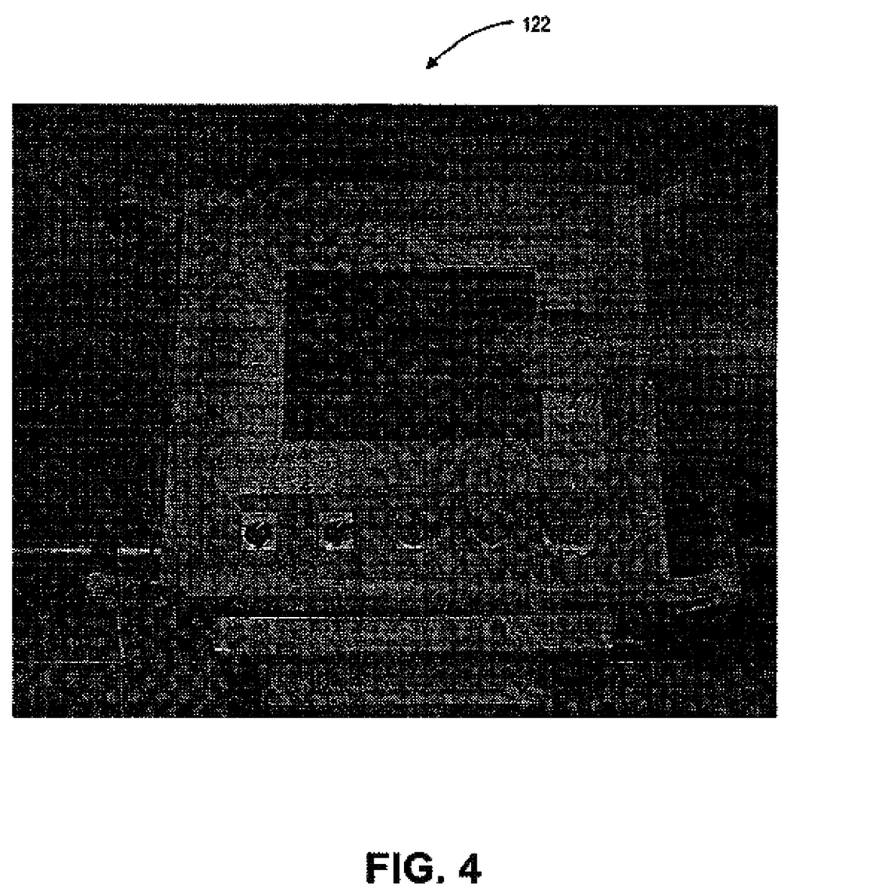
FIG. 4 is a front view of an exemplary input device (touch screen) of FIG. 1.

FIG. 4 is a front view of input device (touch screen) 122. Touch screen 122 is a conventional touch screen device customized for use with the present invention. Not only does touch screen 122 provide a visual interface, it provides sensitive touch pad for easily retrieving information from drawings and entering information for use in fabrication unit 110. In this way, information can be easily entered with little computer know-how. When fabrication software 120 is executed, various interfaces for requesting information from the operator are generated on touch screen 122. In response, information is entered into the system by the operators via touch screen 122. Such information may include one or more specifications for one or more jobs.

Figure 5:
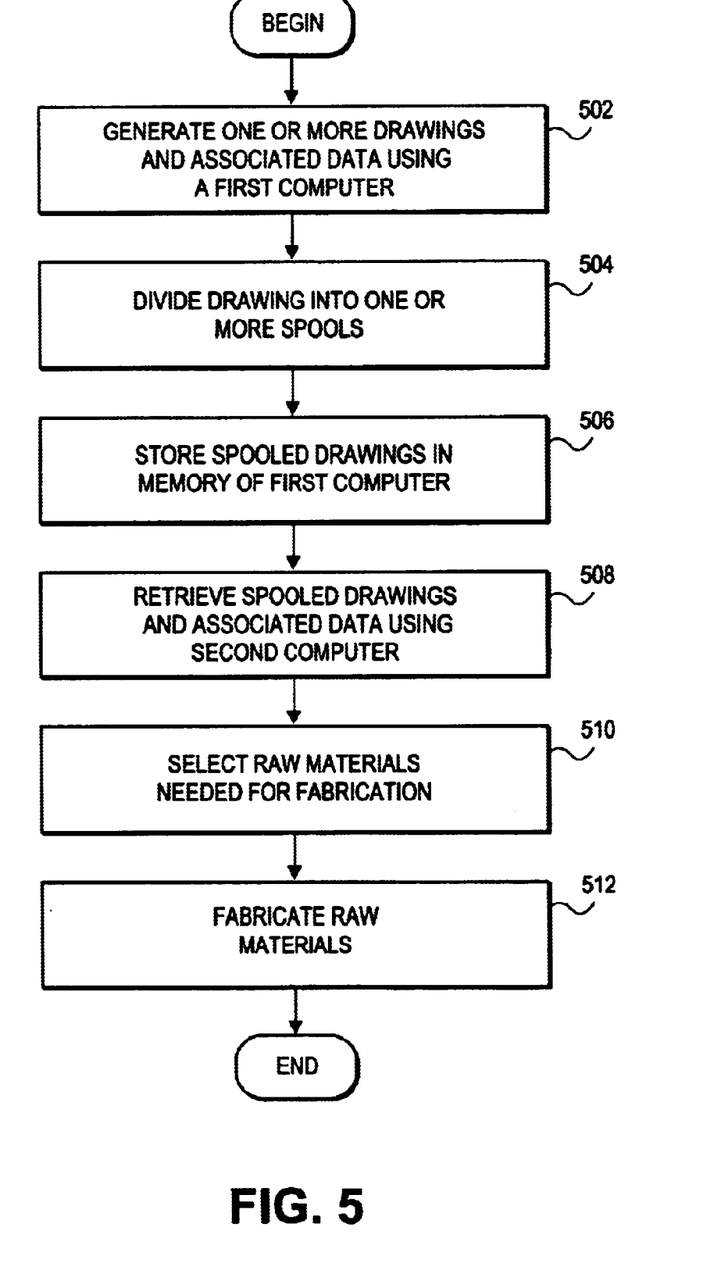
FIG. 5 is flow diagram of a method employed by the pipe fabrication system of FIG. 1 for designing and fabricating piping and structural components for a piping network in accordance with an embodiment of the present invention.

FIG. 5 is flow diagram of a method 500 employed by pipe fabrication system 100 for designing and fabricating piping and structural components for a piping network.

At block 502, one or more pipe drawings and associated data for a piping network are generated. A user such as a designer or architect begins by employing CAD system 102 to generate the pipe drawings and data associated therewith. CAD system 102 includes a large library of generic dimensional requirements and standard sized piping items stored in a database or the like from which the drawings are produced. Also contained in storage are one or more configurations for basic pattern types. The standard sizes are for pipe schedules such as Schedule 40, Schedule 80, etc. Based on the stored information and the pipe drawings, the user designs the piping network. The piping network may be manually or automatically generated. The manual operation will require the user to manually enter all of the piping components and the interconnection between the components.

Further, using CAD system 102, the user may group piping information for easier retrieval. For example, the user can create one or more spools showing how to fabricate and assemble a subsection of the piping network. Another functionality of CAD system 102 is the ability to specify materials to be used. For example, the user may indicate that only certain standard pipe sizes should be used for one or more portions of the drawings. It should be noted that in CAD system 102, the user may specify connections to be used. For example, the CAD can specify whether to bevel the ends, cut the holes and fishmouths based on the pipe IDs, or ODs, or a combination.

CAD system 102 specifies the pipe schedule and standard pipe sizes for the drawing. Thereafter, the drawing is checked for collision with other entities in the piping network. As noted, the generation of piping drawings and associated data can be can be accomplished using PipeDesigner 3D CAD™ which produces three dimensional isometric drawings. By way of example, reference will be made throughout to FIG. 6 which is a piping network 600 for a water heating system generated by PipeDesigner 3D CAD™.

At block 504, the piping network is subdivided into one or more subsystems known as spools. A spool is typically a subset of a drawing that can be fabricated and assembled in the shop and shipped as a single unit to a site. The spools can be selected by a number of different methods.

In one embodiment, the spools are selected by boxing an area with an input device (i.e. a mouse or the like), selecting individual items to include in a spool, and/or selecting a starting and ending point on the system and having everything in between included. For example, in FIG. 6, three spools namely spool 602, spool 604 and spool 606 have been boxed in. While spool 602 consists of a relatively straight pipe, spools 604 and 606 comprise a number of intersections and corresponding parts such as elbows and valves.

Figure 6:
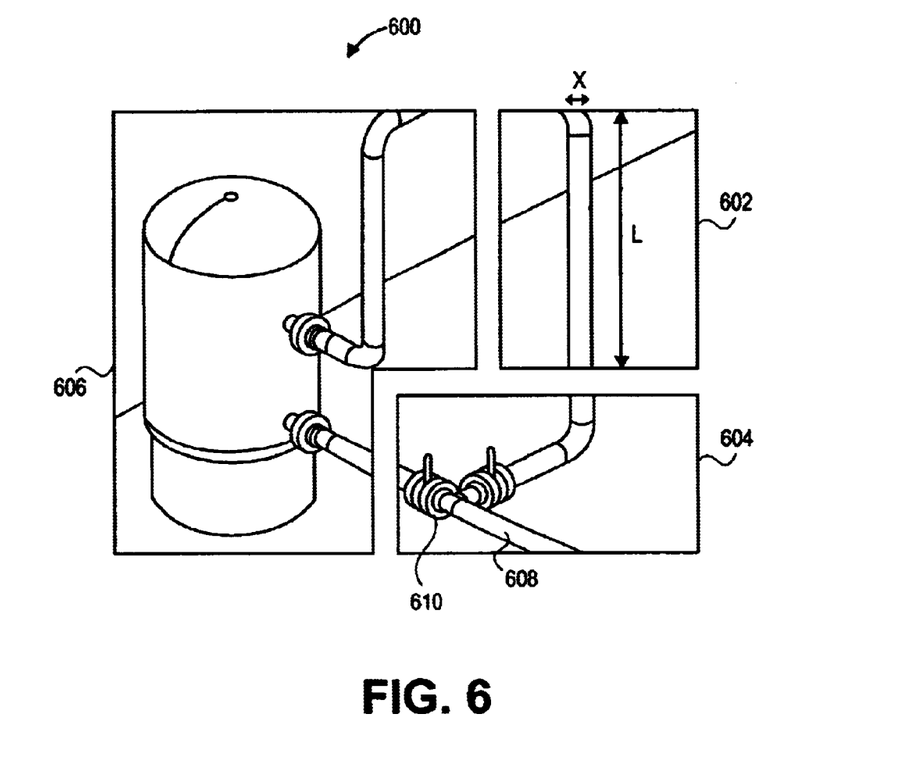
FIG. 6 is an exemplary piping network for a water heating system generated by the CAD system of FIG. 1 illustrating the concept of spooling.

For each spool, CAD system 102 automatically determines the dimensions, specification and other pertinent data for the selected spool. For example, in spool 602 the length "L" and diameter "A" are automatically determined along with the end treatments, pipe schedule, and diameter. It should be observed that the parts and components for the spools are made available for later use by fabrication unit 110. For example, in one embodiment, information regarding individual piping items such as pipes, elbows, valves, etc. are embedded in CAD system 102 drawing files. The drawing files and the tools to extract spool information from the drawing files are also provided.

At block 506, the pipe drawings and associated data are stored in the memory 106 of CAD system 102 for later retrieval.

At block 508, using computing device 116 of fabrication unit 110, the user retrieves from memory 106 into memory 120, the pipe drawings and the associated data. CAD system 102 enables the user to select and store one or more spools for a specified drawing. The drawings are stored in an exemplary file format with a ".dwg" extension that permits searching and embedding of drawing data in the files.

Thereafter, the drawings and the associated data are easily imported using computing device 116. For example, in FIG. 7, a screen shot 700 of fabrication software 124 is shown for selecting and importing one or more spools. Screen shot 700 includes a window 706 for selecting a drawing file, in this case a file named Heating_Spool.dwg; a window 702 displaying a list of available spools for Heating_Spool.dwg; and a button 704 for importing the selected spools.

Figure 7:
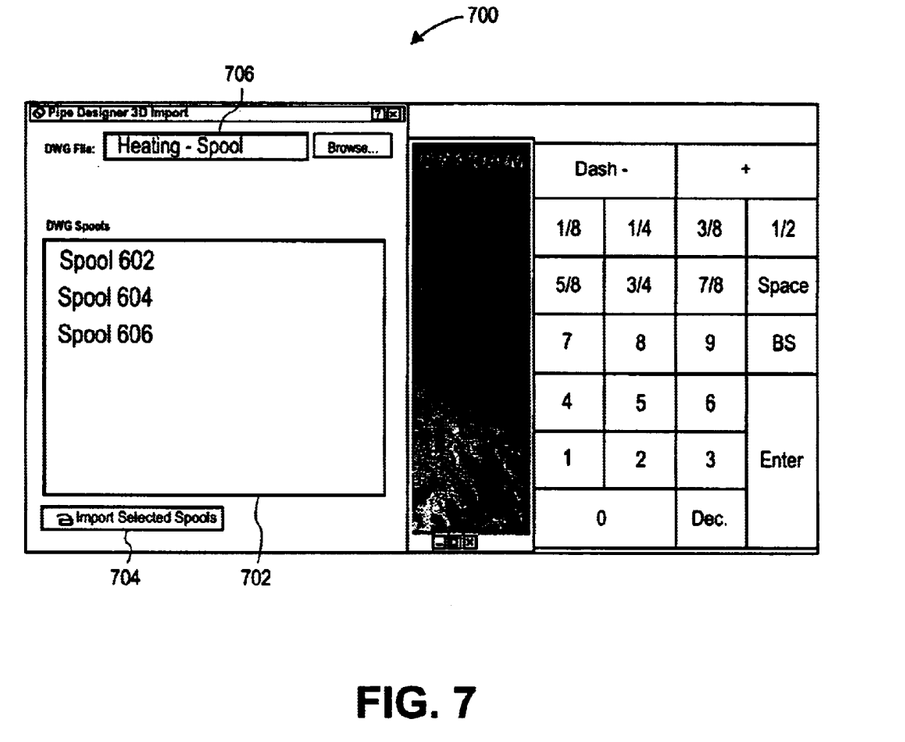
FIG. 7 is a screen shot for selecting and importing one or more spools.

As shown, the spool files for Spool 602, 604 and 606 are shown in window 702. Using touch screen 122, the user selects and import the desired spool files into fabrication unit 110 for fabrication. As noted, each spool file contains information relating to the components such as pipes, elbows, valves etc., interconnections of the components, dimensions, specification and other pertinent data for the selected spool. Such information also includes three dimensional spatial information about the components. Unlike conventional systems, all of this information is automatically transferred to cutting device 112 for fabricating the spool. Alternatively, cutting information may be manually entered via touch screen 122 as further described with reference to FIGS. 8 through 12.

Figure 1B:
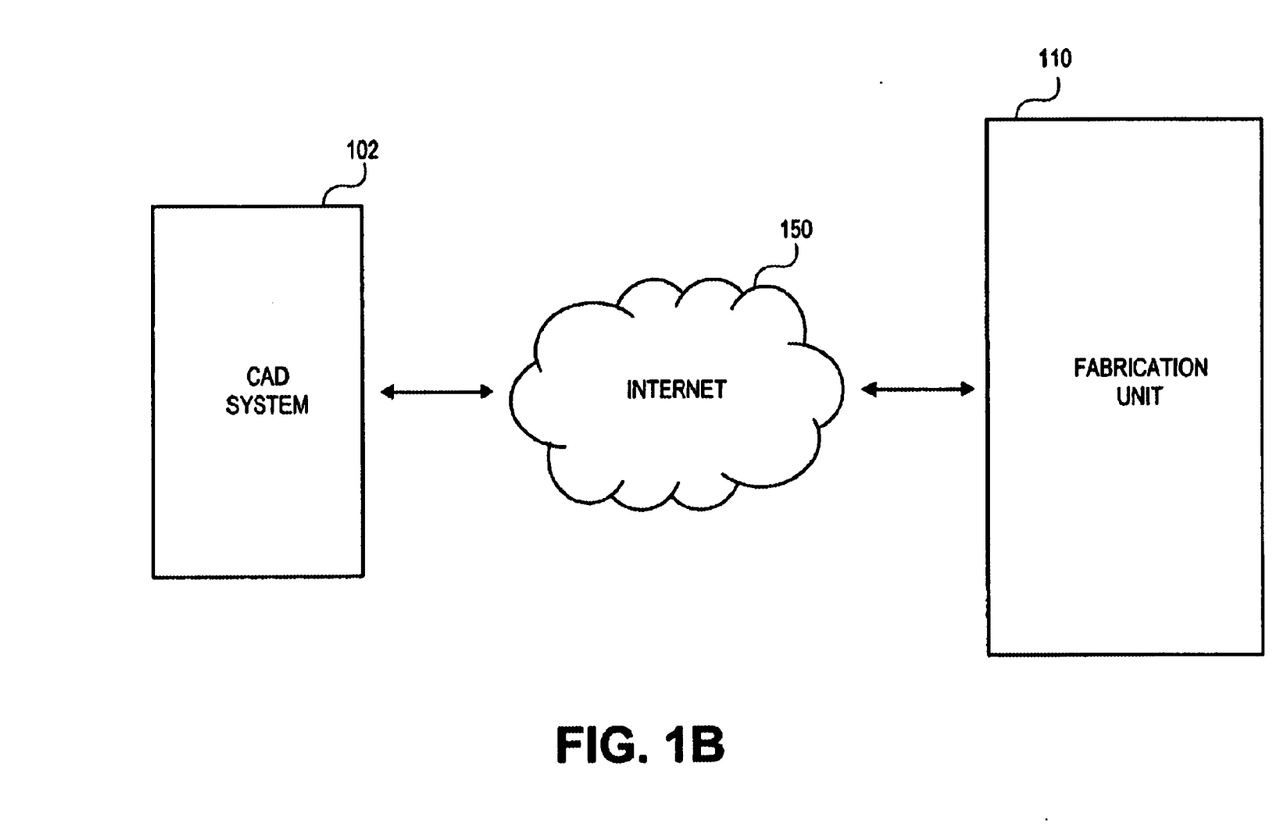
FIG. 1B is an exemplary alternate system for remotely transferring spooling information in accordance with an embodiment of the present invention.

Referring to FIG. 1B, an exemplary alternate system 100 for remotely transferring spooling information is shown. In this embodiment, spooling information is remotely transferred from CAD system 102 to fabrication unit 110 via the Internet 150. Thus a detailer located at a remote office may derive data from finished drawings and send the data remotely to a machine cutting floor. Another alternative (not shown) for transferring data is the so-called SneakerNet wherein data transfer occurs by downloading the information from a first computing device such as CAD system 102 unto a diskette and walking the diskette over to a second computer such as computing device 116 where the information is uploaded.

At block 510, based on the pipe drawings and associated data for each spool, fabrication unit 110 selects one or more pieces of piping and other raw materials needed for the fabrication. For example, for spool 604 (FIG. 6), pipe 608 is selected followed by valve 610. At this point, fabrication unit 110 has processed the received information to produce cutting information for fabricating the components. Fabrication unit 110 also produces labels, barcodes and associated reports. After the pieces of piping are selected, fabrication unit 110 directs the operator to load raw materials for fabricating the selected components.

At block 512, the raw materials are loaded onto conveyor 114 for forwarding to cutting device 112. Fabrication unit 110 fabricates from the raw materials, the piping and structural components for the selected spool. Typically, the raw materials are standard pipes. To fabricate the pipe, fabrication unit 110 rolls the pipe, cuts the end, rolls the pipe to the exact location for a fish mouth, O-let or lateral and simultaneously cuts and bevels the opening.

Advantageously, the bevel cuts are clean and accurate requiring little or no grinding. This increases consistency and avoids the need for re-fabrication. Furthermore, the end treatments determine how the ends are trimmed (i.e. the bevel angle) and the 3-D spatial information determine the hole pattern and the end pattern for the pipe that is doing the intersection. After fabrication, the pipe is advanced, and rotated to the next location for the next cut.

Figure 6A:
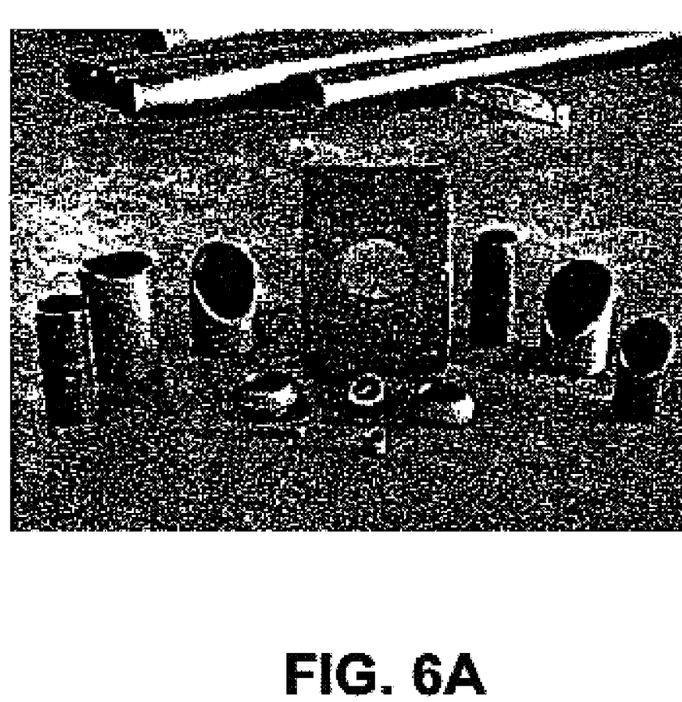
FIG. 6A illustrates various pieces of piping and patterns generated by the fabrication unit.

At this point, the operator simply removes the cut pieces of piping. For each piece of piping, fabrication unit 110 automatically generate a bar code label and spool tags for each fitting so that each fitting can be sorted and sent to the proper location in the field. By way of example, FIG. 6A are various pieces of piping and patterns generated by fabrication unit 110. In a fashion similar to that described above, piping items for structural components such as braces, brackets and the like are fabricated.

It should be observed that fabrication is optimized by one or more computing device 116 sub-routines in a manner that results in optimal shipping and least waste of raw materials. For example, if multiple jobs are being processed by fabrication unit 110, computing device 116 mathematically derives and determines for every raw material which piece of piping or patterns for one job and which respective piece of piping or materials for another job should be simultaneously fabricated. In the same manner, in addition, for the same job, the optimum arrangement of positioning of two or more patterns to be cut is determined so there is little or no waste. In addition, computing device 116 provides the ability to group like piping items to save materials and reduce labor for material handling. For example, cutting all of the 10 inch pipe for a given pipe schedule in a job could reduce material handing.

FIGS. 8 through 12 are screen shots of fabrication software 124 for receiving, processing and forwarding pipe drawings and associated data to fabrication unit 110.

One of ordinary skill in the art will realize that all of the screen shots are exemplary. Further, in addition to the below mentioned functionality of the screen shots, the screen shots further serve to illustrate the type of information which may be embedded and extracted from drawing files and automatically retrieved from a first computer such as CAD system 102 to a second computer such as computing device 116. Further, the screen shots are implementable via one or more software instructions via an appropriate coding language such as C++, Visual Basic and the like.

Figure 8:
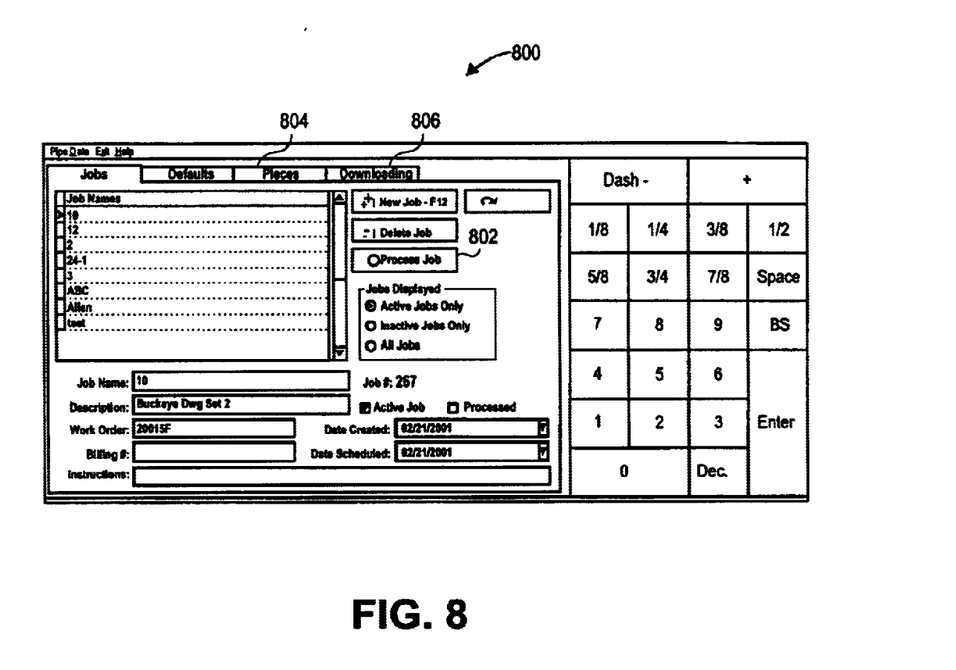
FIG. 8 is a main menu screen shot 800 for processing pipe drawings and associated data for the fabrication unit.
Figure 9:
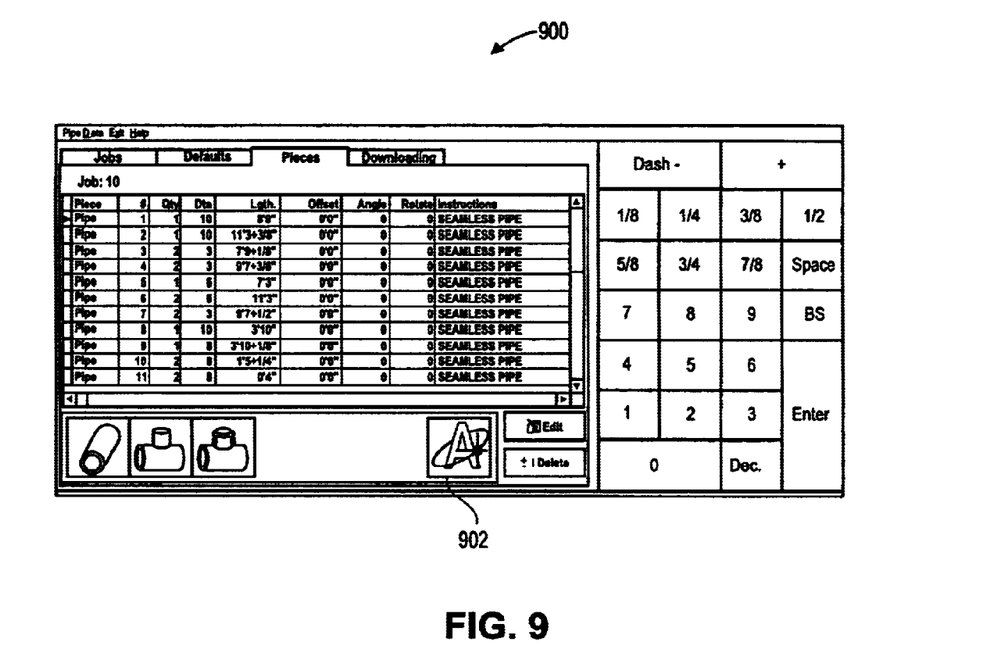
FIG. 9 is a screen shot for displaying pieces of piping entered for a job.

FIG. 8 is a main menu screen shot 800 for processing pipe drawings and associated data for fabrication unit 110. As shown, screen shot 800 includes a button 802 for processing jobs When pressed, the computer computes all of the information necessary to move and rotate the pipe to cut the holes, fish mouths, laterals, end trims, etc.; a button 804 for displaying pipe pieces associated with a job; and a button 806 for displaying pipes to be loaded for a job. When button 804 is selected, screen shot 900 of FIG. 9 is displayed. In screen shot 900, the pieces of piping entered for a job are displayed. For example, for a job 10, a pipe 1 having a diameter 10, length 8'9", angle 0, a 0 rotation, etc is displayed. Upon selecting button 902, screen shot 700 is displayed in accordance with a first embodiment of the present invention as earlier described.

Figure 10:
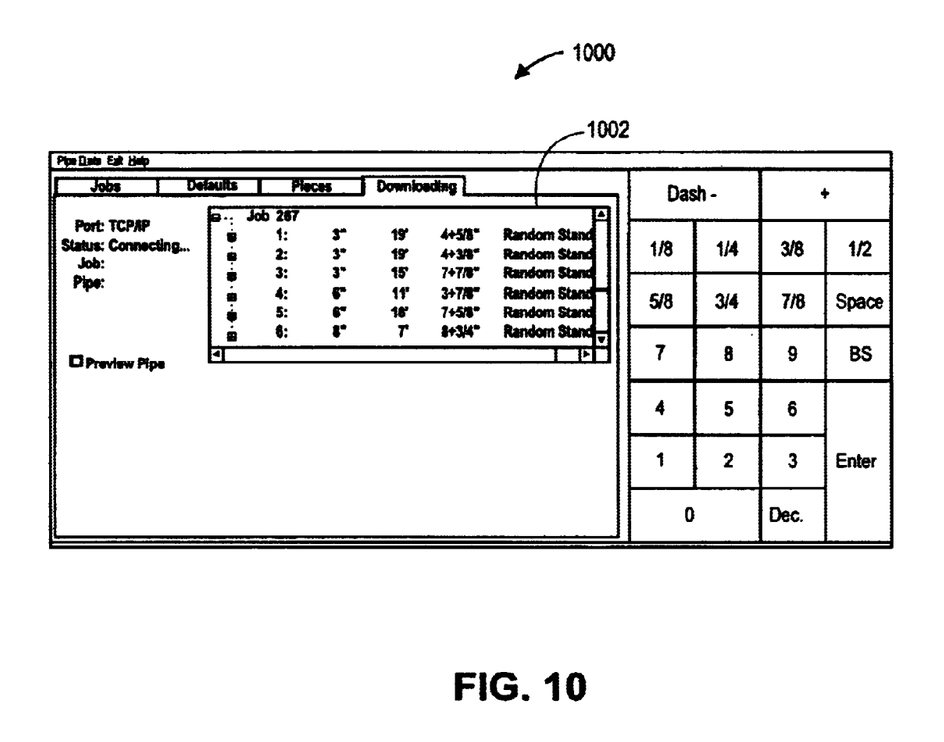
FIG. 10 is screen shot for displaying the pipes to be loaded for a job.
Figure 11:
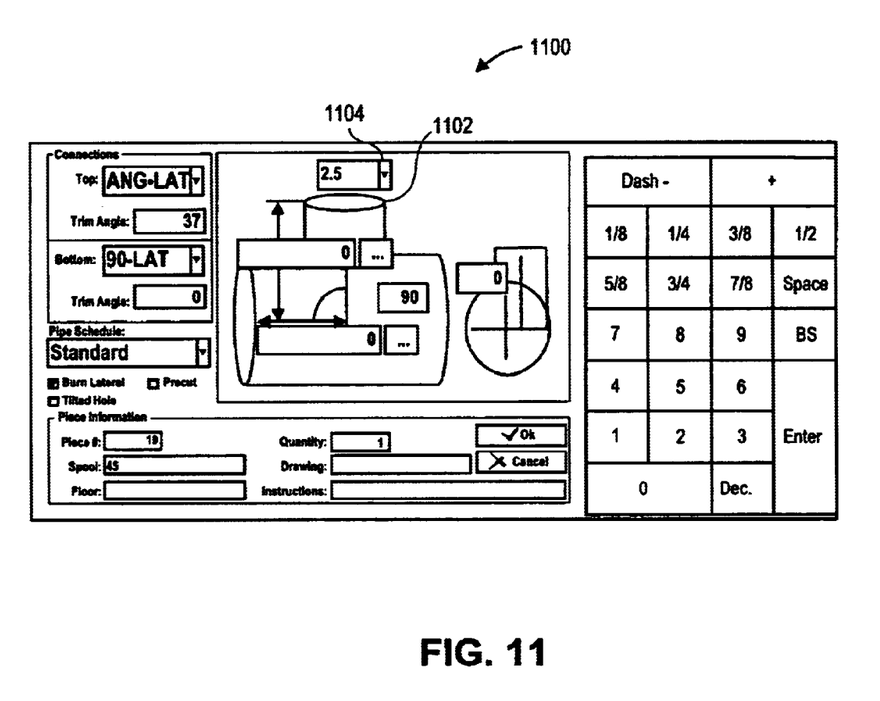
FIG. 11 is a screen shot for entering a lateral.
Figure 12:
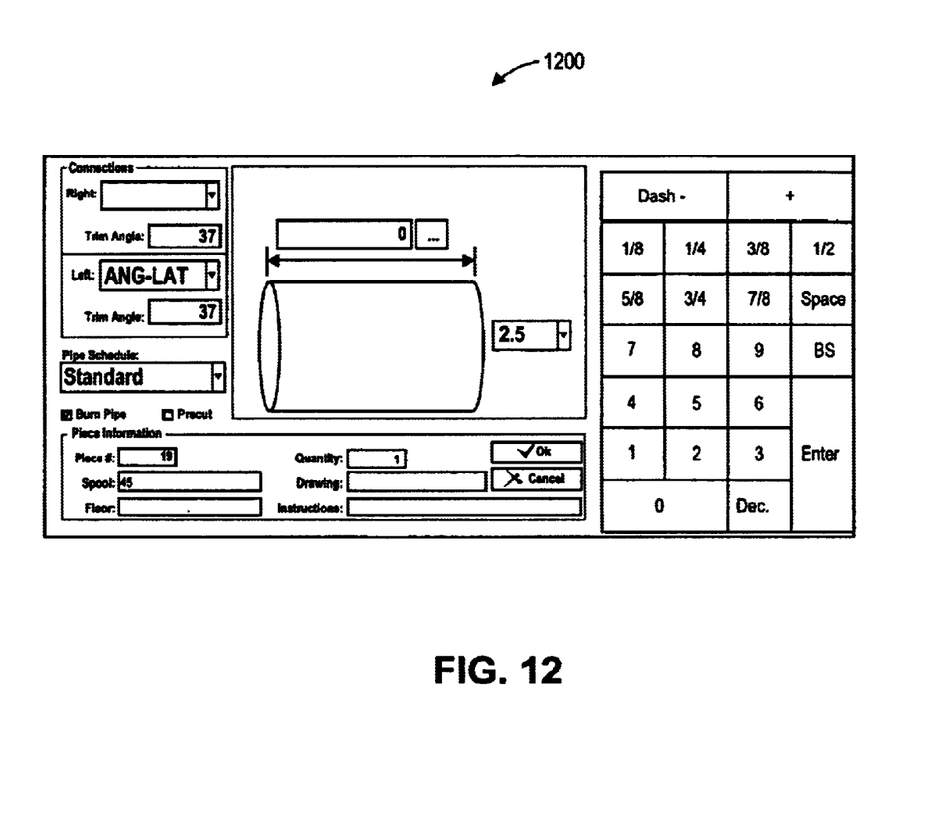
FIG. 12 is a screen shot for entering a piece of piping item.

Referring to FIG. 8, when button 806 is selected, screen shot 1000 of FIG. 10 is displayed. Screen shot 1000 displays the pipes to be loaded for a job. For example, pipes 1 through 6 for a job 267 and corresponding information are shown. FIG. 11 is a screen shot 1100 for entering a lateral. The various dimensions of each lateral can be entered as shown. For example, the top diameter 1102 of the lateral is 2.5" and may be modified by selecting the dropdown button 1104. FIG. 12 is a screen shot 1200 for entering a piece of piping item. The various dimensions of the piping item can be entered as shown.

In this fashion, the present invention teaches a piping and structural component designing and fabrication system. While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. A method for designing and fabricating piping and structural components for a piping network, the method comprising:

providing a computer system that has a first and a second computing device;

generating one or more pipe drawings and associated data for the piping network with the computer system;

storing the pipe drawings and associated data in a memory of the first computing device for later retrieval;

selecting the pipe drawings and automatically reading the associated data to a second memory of the second computing device;

based on the pipe drawings and associated data, selecting one or more pieces of piping and oilier raw material needed for the fabrication; and fabricating from the raw materials, the piping and structural components for the piping network.

2. The meted of claim 1 wherein generating one or more pipe drawings further comprises spooling the one or more pipe drawings into two or more sections.

3. The method of claim 1 wherein the act of fabricating from raw materials further comprises fabricating the piping and structural components in an optimized manner that results in minimizing the waste of raw materials.

4. The method of claim 1 wherein the first computing device and the second computing device are locally coupled.

5. The method of claim 1 wherein the first and the second computing device are remotely coupled.

6. The method of claim 1 wherein the act of fabricating from the raw materials is by a fabrication unit having a cutting device.

7. The method of claim 1 further comprising determining by the second computer device one or more design patterns based on the pipe drawings and associated data.

8. The method of claim 1 further comprising positioning design patterns into a series of groupings; and selecting which grouping yields a minimum usage of raw materials.

9. The method of claim 1 wherein said act of selecting raw materials further comprises automatically selecting the raw materials for fabricating the piping and structural components.

10. The method of claim 1 wherein the act of selecting raw materials further comprises manually determining the raw materials for fabricating the piping and structural components.

11. The method of claim 1 further comprising specifying connections to be used during said act of fabricating the piping and structural components.

12. The method of claim 1 wherein the amount of raw materials utilized is optimized for shipping.

13. The method of claim 1 wherein the amount of raw materials utilized is optimized to reduce labor for material handling.

14. The method of claim 1 further comprising determining raw material weights to optimize for shipping the piping and structural components.

15. A system for designing and fabricating piping and structural components, the system comprising:
- a design computing device for preparing drawings and associated data for one or more piping and structural components, said drawings being capable of being stored in memory of the design computing device; and
- a fabrication unit further comprising a fabrication computing device and a cutter;
- wherein in response to a request from said fabrication computing device, the design computing device automatically forwarding said drawings and associated data to the fabrication computing device;
- wherein the fabrication unit being such that upon receiving said drawings, raw materials are loaded onto the fabrication unit; and
- wherein the cutter automatically cutting the raw materials received in accordance with said drawings and associated data.

16. The system of claim 15 wherein said drawings and associated data are capable of being stored in a memory of said fabrication computing device for later retrieval.

17. The system of claim 15 wherein said fabrication computing device is capable of extracting pattern information from said drawings and associated data.

* * * * *